(12) United States Patent
Weng et al.

(10) Patent No.: US 7,930,168 B2
(45) Date of Patent: Apr. 19, 2011

(54) NATURAL LANGUAGE PROCESSING OF DISFLUENT SENTENCES

(75) Inventors: Fuliang Weng, Palo Alto, CA (US); Qi Zhang, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 1043 days.

(21) Appl. No.: 11/243,571

(22) Filed: Oct. 4, 2005

(65) Prior Publication Data

US 2007/0078642 A1    Apr. 5, 2007

(51) Int. Cl.
*G06F 17/20*    (2006.01)
*G06F 17/27*    (2006.01)

(52) U.S. Cl. .............................. 704/9; 704/1
(58) Field of Classification Search ................. 704/1–10
See application file for complete search history.

(56) References Cited

U.S. PATENT DOCUMENTS

| | | | | |
|---|---|---|---|---|
| 5,890,103 | A * | 3/1999 | Carus | 704/9 |
| 7,251,781 | B2 * | 7/2007 | Batchilo et al. | 715/210 |
| 7,286,987 | B2 * | 10/2007 | Roy | 704/270 |
| 2004/0243409 | A1 * | 12/2004 | Nakagawa | 704/240 |

OTHER PUBLICATIONS

Church, K.W., "A stochastic parts program and noun phrase parser for unrestricted text," Acoustics, Speech, and Signal Processing, 1989. ICASSP-89., 1989 International Conference on , vol., No., pp. 695-698 vol. 2, May 23-26, 1989.*
A. Ratnaparkhi. 1996. A maximum entropy model for part-ofspeech tagging. In Proceedings of EMNLP-1996.*
Cole, Jennifer / Hasegawa-Johnson, Mark / Shih, Chilin / Kim, Heejin / Lee, Eun-Kyung / Lu, Hsin-yi / Mo, Yoonsook / Yoon, Tae-Jin (2005): "Prosodic parallelism as a cue to repetition and error correction disfluency", In DiSS-2005, 53-58.*
Johnson, M. and Charniak, E. 2004. A TAG-based noisy channel model of speech repairs. In Proceedings of the 42nd Annual Meeting on Association For Computational Linguistics (Barcelona, Spain, Jul. 21-26, 2004). Annual Meeting of the ACL. Association for Computational Linguistics, Morristown, NJ, 33. DOI= http://dx.doi.org/10.3115/1218955.1218960.*
Mark Johnson , Eugene Charniak , Matthew Lease. 2004. An improved model for recognizing disfluencies in conversational speech. In Proceedings of Rich Transcription Workshop.*
Johnson, Mark. Charniak, Eugene. Lease, Matthew. An improved model for recognizing disfluencies in conversational speech, 2004. Brown Laboratory for Linguistic Information Processing, Brown University.*
Kim, Joungbum, "Automatic Detection of Sentence Boundaries, Disfluencies, and Conversational Fillers in Spontaneous Speech", 2004, Graduate School-Master Theses, University of Washington, pp. 1-85.
Spilker, Jorg et al., "Detection and Correction of Speech Repairs in Word Lattices", PROC Eurospeech, vol. 5, Sep. 1997, pp. 1-4.
Charniak, Eugene et al., "Edit Detection and Parsing for Transcribed Speech", PROC. NAACL- Language Technologies, Jul. 2, 2001, pp. 1-9.
Zhang, Qi et al., "Exploring Features for Identifying Edited Regions in Disfluent Sentences", Proc. International Workshop on Parsing Technologies (IWPT), Oct. 9, 2005, pp. 179-185.

* cited by examiner

*Primary Examiner* — Talivaldis Ivars Smits
*Assistant Examiner* — Matthew H Baker
(74) *Attorney, Agent, or Firm* — Dergosits & Noah LLP; Geoffrey T. Staniford

(57) ABSTRACT

An advanced model that includes new processes is provided for use as a component of an effective disfluency identifier. The disfluency identifier tags edited words in transcribed speech. A speech recognition unit in combination with a part-of-speech tagger, a disfluency identifier, and a parser form a natural language system that helps machines properly interpret spoken utterances.

14 Claims, 5 Drawing Sheets

| Variable | Name | Description |
|---|---|---|
| $X_1$ | $W_0$ | The current orthographic word. |
| $X_2 - X_5$ | $P_0, P_1, P_2, P_f$ | Partial word flags for the current position, the next two to the right, and the first one in a sequence of free-final words (partial, conjunctions, etc.) to the right of the current position. |
| $X_6 - X_{10}$ | $T_{-1}, T_0, T_1, T_2, T_f$ | Part of speech tags for the left position, the current position, the next two positions to the right, and the first free-final word position to the right of the current position (when using hierarchical tags for rough copy the variables are hierarchical tags). |
| $X_{11}$ | $N_m$ | Number of words in common in reparandum and repair |
| $X_{12}$ | $N_n$ | Number of words in reparandum but not repair |
| $X_{13}$ | $N_i$ | Number of words in interregnum |
| $X_{14}$ | $N_l$ | Number of words to the left edge of reparandum |
| $X_{15}$ | $N_r$ | Number of words to the right edge of reparandum |
| $X_{16}$ | $C_t$ | The first non-punctuation tag to the right of the current position |
| $X_{17}$ | $C_w$ | The first non-punctuation word to the right of the current position |
| $X_{18}$ | $T_i$ | The tag of the first word right after the interregnum that is right after the current word. |
| $X_{19}$ | $D$ | Distance to the nearest same word. |
| $X_{20} - X_{29}$ | $W_{-5}...W_{-1}, W_{+1}...W_{+5}$ | Words at positions 5, 4, 3 etc to the left and right of the current position. |
| $X_{30} - X_{33}$ | $T_{-5}...T_{-2}$ | Part of speech tags for the positions 5, 4, 3, etc to the left of the current position (when using hierarchical tags for rough copy the variables are hierarchical tags). |
| $X_{34} - X_{35}$ | $T_4, T_5$ | Part of speech tags for the positions 4 and 5 to the right of the current position (when using hierarchical tags for rough copy the variables are hierarchical tags). |
| $X_{36} - X_{38}$ | $P_{-1}, P_{-2}, P_{-3}$ | Partial word flags for the positions 1, 2 and 3 to the left of the current position. |

FIG. 5

NATURAL LANGUAGE PROCESSING OF DISFLUENT SENTENCES

TECHNICAL FIELD

The invention relates generally to natural language processing. In particular it relates to processing disfluent sentences.

BACKGROUND

Natural language processing is the science of making computers interpret instructions or information in the way that a person does. Consider as an example the task of setting the temperature of an oven for baking. Practically anyone can understand the spoken instruction, "set the oven to three hundred and fifty degrees." Furthermore variations such as, "set the umm burner, I mean oven, to three hundred and fifty degrees" or "set the oven to, you know, like three hundred and fifty degrees" are understood perfectly by people.

A computer controlled oven, however, has difficulty knowing what parts of the spoken instructions to ignore even if it is able to convert the sounds of speech into text words with perfect accuracy. How is the computer supposed to interpret "umm burner, I mean oven" ? What does a person mean by "you know, like"?

The filled pauses ("umm"), parenthetical expressions ("you know"), incorrect grammar and speech repairs ("burner, I mean oven") of natural speech are stumbling blocks for computers trying to find meaning in the spoken language of people. Researchers in natural language processing have taken the approach that the simplest way for a computer to handle these stumbling blocks is to delete them. If the computer could be trained to ignore "umm burner, I mean" or "you know, like" in the transcribed speech above, then the remaining words would be easier for a conventional text parser to interpret.

A great deal of effort has been put into developing an automatic system for identifying parts of spoken sentences that a computer would be better off ignoring for certain purposes or be used for other purposes. More specifically, systems have been developed to identify so-called edited words in transcribed speech; i.e. words that a computer should not bother trying to understand.

Charniak and Johnson [Eugene Charniak, and Mark Johnson, "Edit Detection and Parsing for Transcribed Speech", Proceedings of the 2nd Meeting of the North American Chapter of the Association for Computational Linguistics, pp 118-126, (2001) (incorporated herein by reference and hereinafter referred to as "C&J")] presented a simple architecture for parsing transcribed speech in which an edited-word detector first removes such words from the sentence string, and then a standard statistical parser trained on transcribed speech parses the remaining words.

In order to evaluate the performance of different methods and systems for natural language processing many researchers, including Charniak and Johnson, use the Switchboard corpus provided by the Linguistic Data Consortium. The Switchboard corpus is an extensive set of transcribed telephone conversations that have been tagged by human annotators. The performance of a natural language processing system may be evaluated by comparing the results it generates with those recorded by humans.

Improving the performance of natural language processing systems depends in part on designing better disfluence identifiers of which edited-word detectors are a prime example. A disfluence identifier operates with a model which may comprise a statistically weighted set of features that act like clues to help find disfluences such as edited words.

The technical area of creating better models and feature sets is one that is ripe for innovation. Advances in the field come from researchers' deep understanding of, and ability to combine seemingly counterintuitive insights in, linguistics, statistics, and computer algorithms among other disciplines.

BRIEF DESCRIPTION OF THE DRAWINGS

FIG. 5 lists the number, name and description of an assortment of conditioning variables.

DETAILED DESCRIPTION

Figure 1:
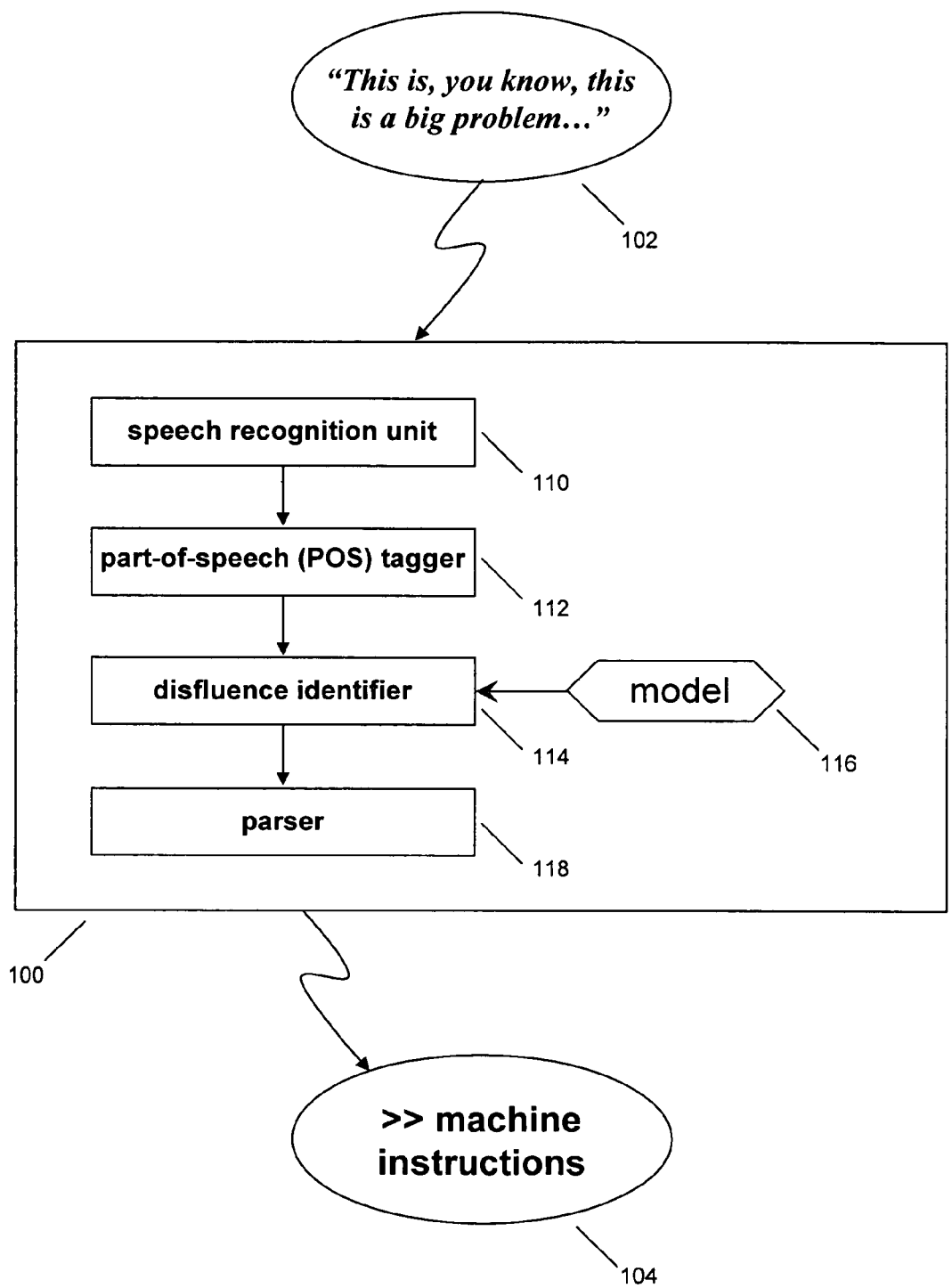
FIG. 1 shows schematically a natural language processing system.

FIG. 1 shows schematically a natural language processing system 100. The system interprets spoken word inputs such as sentence fragment 102 and outputs computer recognizable code such as machine instructions 104. The system as a whole lets a person talk directly to a computer using normal human speech.

The main components of system 100 are a speech recognition unit 110, a part-of-speech tagger 112, a disfluence identifier 114, and a parser 118. The disfluence identifier operates using a model 116.

Speech recognition unit 110 transcribes the sounds of human speech into text data. This text is then sent to part-of-speech tagger 112 which labels each text word with a part-of-speech (POS) tag such as "noun", "verb", etc. The text, now annotated with POS tags, is input to a disfluence identifier 114. The disfluence identifier and its model 116 decide which words should be edited from the text and ignored in order to realize improved parsing performance by the computer. Finally, parser 118 converts edited text into machine instructions; i.e. computer commands.

Natural language processing system 100 and its components represent a complex apparatus. The description below focuses primarily on disfluence identifier 114 and its associated model 116 but the embodiment is not so limited. In fact, the performance of a disfluence identifier can depend on how its model is generated.

Figure 2:
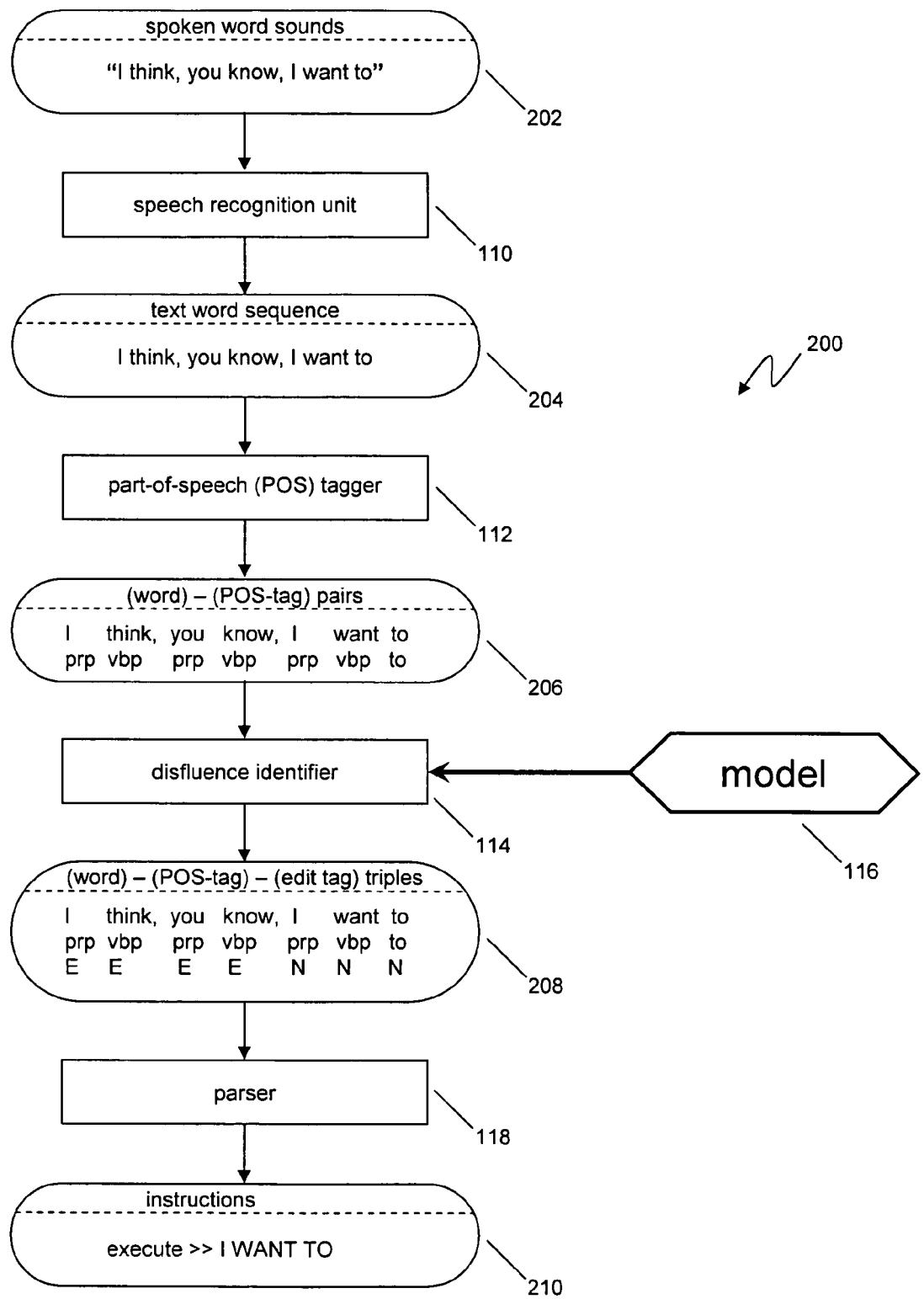
FIG. 2 shows schematically a method for natural language processing as used in the system of FIG. 1.

FIG. 2 shows schematically a method 200 for natural language processing as used in the system 100 of FIG. 1. In FIG. 2 item 202 represents the spoken word sounds "I think, you know, I want to." These sounds would be instantly recognized by a person and most likely could be safely interpreted as simply, "I want to." In other words, one way to respond to "I think, you know, I want to," is to simply ignore "I think, you know," and react only to "I want to." The method shown in FIG. 2 (and the system shown in FIG. 1) is designed to filter out edited words such as "I think, you know," as a way of improving the accuracy of machine interpretation of spoken language.

Spoken word sounds 202 are the input to a speech recognition unit 110. Speech recognition unit 110 converts word sounds into text such as text word sequence 204 where the lack of quotation marks [around I think, you know, I want to] emphasizes that the words now represent text data. Text words are then sent to part-of-speech (POS) tagger 112. The output of the POS tagger is a sequence of word—POS-tag pairs such as those in item 206. In 206, word 'I' is paired with tag 'prp', word 'think' is paired with tag 'vbp', etc.

The sequence of word—POS-tag pairs is then processed by disfluence identifier 114. The disfluence identifier decides which words should be edited; i.e. ignored in further processing. The word—POS-tag—edit-tag triples in item 208 show that, as an example, 'I', 'think', 'you', and 'know' are all edited words while 'I', 'want' and 'to' are normalwords. When the sequence 'I think, you know, I want to' is sent to parser 118, the edited words are ignored. Parser 118 operates under the assumption that only normal words carry information. Finally parser 118 converts normal words into instructions. As one example, parser 118 converts normal words into machine readable instructions. In item 210 the machine instructions are represented as 'execute >>I WANT TO'.

In FIGS. 1 and 2, item 116 is a model which is used by disfluence identifier 114. The model represents the clues and strategies used by the disfluence identifier to find edited words. An aspect of an embodiment rests in the detailed manner in which the model is created. Understanding the design of the model depends upon a thorough appreciation for the characteristics of spoken language and statistical algorithms among other topics.

Repairs, hesitations, and restarts are common in spoken language, and understanding spoken language requires accurate methods for identifying such disfluent phenomena. Processing speech repairs properly poses a challenge to spoken dialog systems.

Processing speech repairs under an embodiment starts by analyzing the distributions of the edited regions and their components in a target corpus. Several feature spaces are provided to cover the disfluent regions in the training data. In addition, new feature spaces of a part-of-speech hierarchy are explored and candidate pools are extended in experiments. The processing of an embodiment provides a significant improvement in F-score over the result reported in C&J, where punctuation is included in both the training and testing data of the Switchboard corpus, and a significant error reduction in F-score over their recent results where punctuation is ignored in both the training and testing data of the Switchboard corpus.

Following the conventional definition, a speech repair is divided into three parts: the reparandum, the part that is repaired; the interregnum, the part that is either empty or fillers; and the repair/repeat, the part that replaces or repeats the reparandum. This definition is exemplified by the following utterance:

<u>This is</u>, <u>you know</u>, <u>this is</u> a big problem.
reparandum  int erregnum  repeat In analyzing speech repairs in the Switchboard corpus it is noted that Switchboard has over one million words, consisting of transcribed telephone conversations between strangers on assigned topics. It is full of disfluent utterances which have been analyzed and categorized by others. Other researchers have reported detailed distributions of the interregna, including interjections and parentheticals. However, the majority of the disfluencies involve all three parts (reparandum, interregnum, and repair/repeat). Findings indicate that the distributions of all three parts are necessary in constructing patterns that are used to identify edited regions.

For the reparandum and repair types, distributions are computed with and without punctuation. Distributions were computed with punctuation for comparison with the baseline system reported in C&J, where punctuation is included to identify the edited regions. The interregnum type, by definition, does not include punctuation.

Figure 4A:
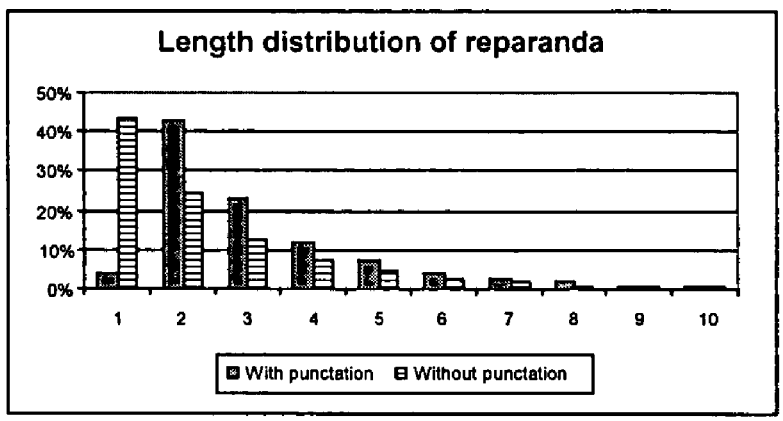
FIGS. 4A, 4B and 4C show the length distribution of reparanda, repairs and interregna respectively in a test corpus.
Figure 4B:
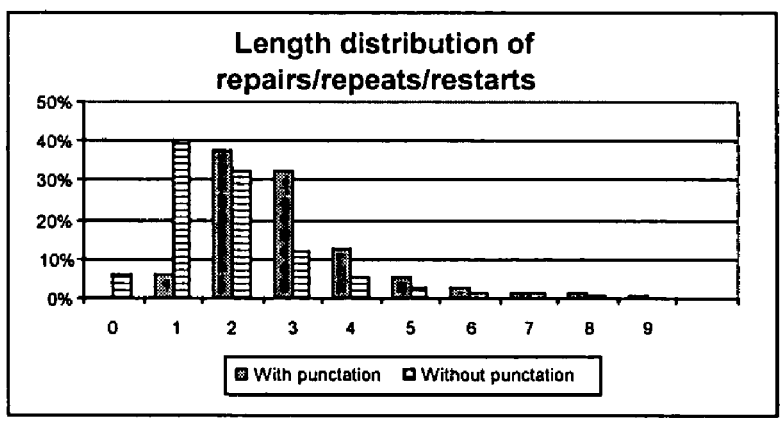
Figure 4C:
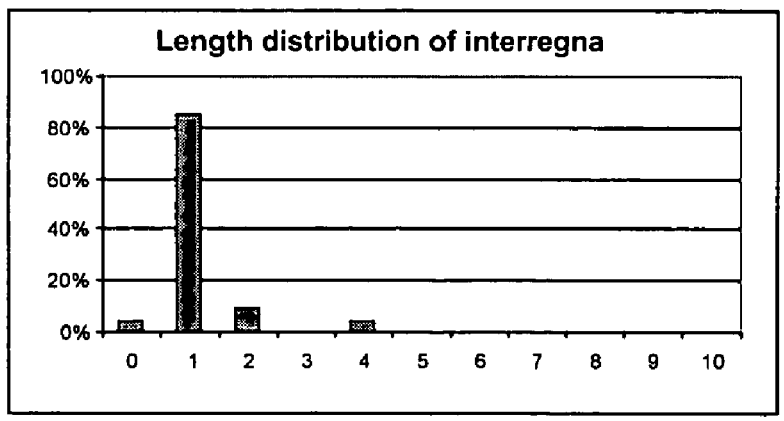

FIGS. 4A, 4B, and 4C show the length distribution of reparanda, repairs and interregna in a test corpus. The length distributions 402 of the reparanda in the training part of the Switchboard data with and without punctuation are given in FIG. 4A. Reparanda with lengths of less than 7 words make up 95.98% of such edited regions in the training data. When the punctuation marks are removed, those with lengths of less than 6 words reach roughly 96%. Thus, patterns that consider only reparanda of length 6 or less will have very good coverage.

Repair/repeat part distributions 404 in for the training part of the Switchboard are given in FIG. 4B. Repairs/repeats with lengths less than 7 words make 98.86% of such instances in the training data. This gives excellent coverage if one uses 7 as a threshold for constructing repair/repeat patterns.

The length distribution of the interregna 406 of the training part of the Switchboard corpus is shown in FIG. 4C. It can be seen that the overwhelming majority have length one; these are mostly words such as "uh", "yeah", or "uh-huh".

Examination of the Switchboard data reveals that a large number of reparanda and repair/repeat pairs differ on less than two words, i.e. "as to, you know, when to", and the number of pairs differing by less than two POS tags is even bigger. There are also cases where some of the pairs have different lengths. These findings provide a basis for the feature space of embodiments described herein.

Using as a baseline system the work by C&J, rough copy is defined to produce candidates for any potential pairs of reparanda and repairs. A boosting algorithm is used to detect whether a word is edited. A total of 18 variables are used in the conventional algorithm. However, the features of an embodiment described herein also apply to other learning algorithms, such as conditional maximum entropy modeling and Bayesian classifiers.

Intuitively, the boosting algorithm combines a set of simple learners iteratively based on classification results on a set of training data. The training data is scaled after each iteration so that the parts of the data previous classifiers performed poorly on are weighted higher. The weighting factors of the learners are adjusted accordingly.

The boosting algorithm reported by C&J is implemented in an embodiment as a baseline system in order to clearly identify contributing factors in performance. Each word token is characterized by a finite tuple of random variables $$(Y, X_1, \ldots, X_m).$$

Y is the conditioned variables and ranges from $\{-1, +1\}$, with Y=+1 indicating that the word is edited. $X_1, \ldots, X_m$ are the conditioning variables; each variable $X_j$ ranges over a finite set $\chi_j$. The goal of the classifer is to predict the value of Y given a value for $X_1, \ldots, X_m$.

A boosting classifier is a linear combination of n features to define the prediction variable Z, $$Z = \sum_{i=1}^{n} \alpha_i F_i \qquad (1)$$

where $\alpha_i$ is the weight to be estimated for feature $\phi_i$. $\phi_i$ is a set of variable-value pairs, and each $F_i$ has the form of:

$$F_i = \prod_{<X_j, x_j> \in \phi_i} (X_j = x_j) \quad (2)$$

with X's being conditioning variables and x's being values. Each component in the production for $F_i$ is defined as:

$$(X_j = x_j) = \begin{cases} 1 & <X_j = x_j> \in \phi_i \\ 0 & \text{otherwise} \end{cases} \quad (3)$$

In other words, $F_i$ is 1 if and only if all the variable-value pairs for the current position belong to $\phi_i$.

The prediction made by the classifier is $\text{sign}(Z)=Z/|Z|$. One embodiment therefore adjusts the vector of feature weights $\bar{\alpha}=(\alpha_1 \ldots, \alpha_n)$ to minimize the expected misclassification rate $E[\text{sign}(Z) \neq Y]$. This function is difficult to minimize, so the boosting classifier of an embodiment minimizes the expected boost loss $\hat{E}_t[(\exp(-YZ))]$ where $\hat{E}_t[\cdot]$ is the expectation on the empirical training corpus distribution. In an implementation, each learner contains only one variable. The feature weights are adjusted iteratively, one weight per iteration. The adjustments to the feature weights reduce the boost loss on the training corpus. Experiments show that $\bar{\alpha}$ is obtained after 1500 iterations, and contains around 1350 non-zero feature weights.

Figure 3:
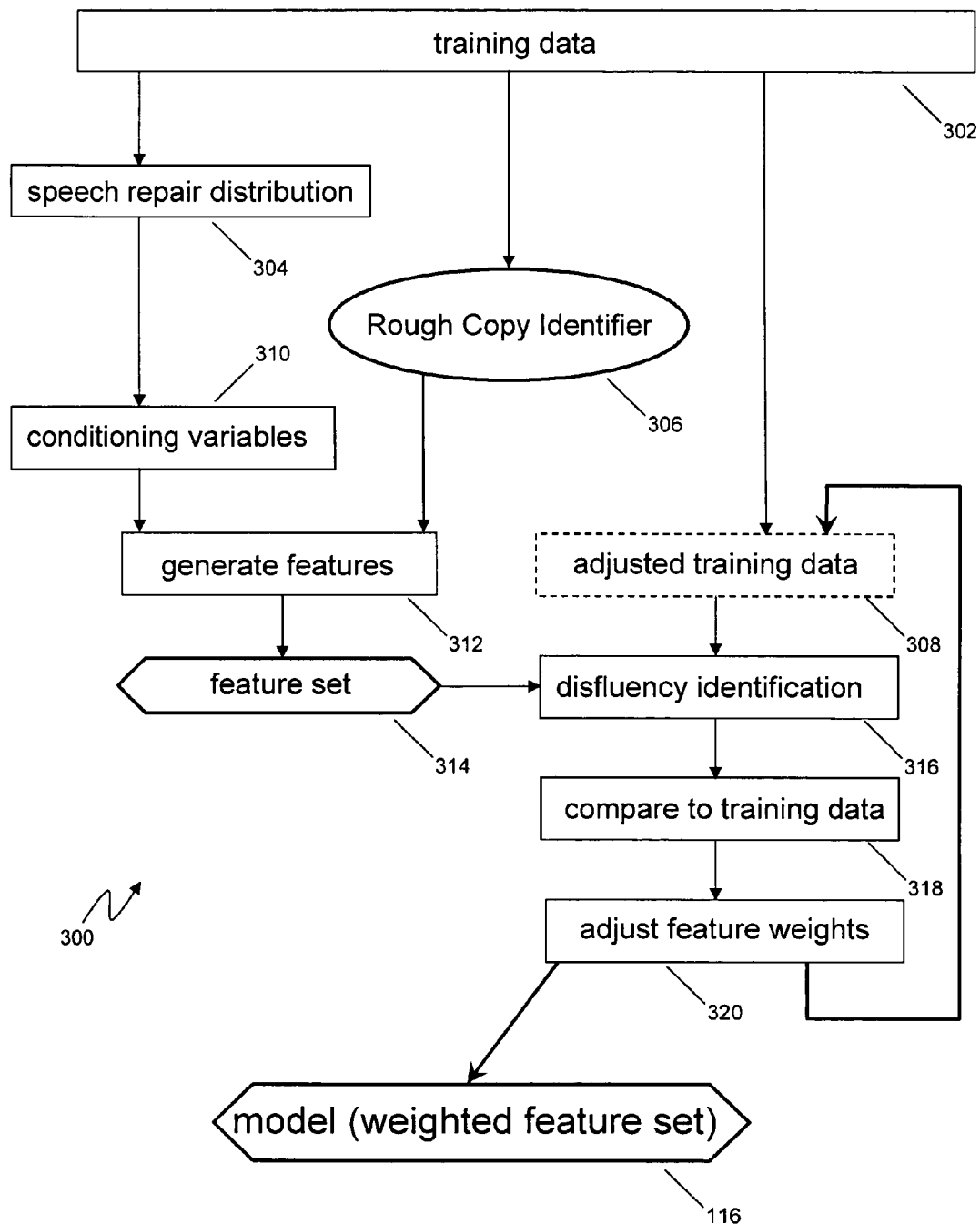
FIG. 3 is a flow chart illustrating how a model for a disfluency identifier is created.

FIG. 3 shows a flow chart 300 illustrating how a model for a disfluency identifier is created. In FIG. 3 characteristics of a set of training data 302 are analyzed and used to formulate a feature set 314. This feature set is used with a disfluency identifier in a boosting algorithm comprising: disfluency identification 316, comparison to training data 318, adjustment of feature weights 320 and adjustment of training data 308. Finally, a model 116 comprising an optimized, weighted feature set is created.

Training data 302 is analyzed to find speech repair distributions 304 such as the distributions shown in FIGS. 4A, 4B, and 4C. Intuition gathered from analysis of the speech repair distributions plus other considerations leads to the selection of a set of conditioning variables 310. A set of conditioning variables is further described in connection with FIG. 5 below.

Training data 302 is also input to a rough copy identifier 306 as described in more detail below. Conditioning variables 310 and the output from the rough copy identifier 306 are used to generate features 312 resulting in a feature set 314.

Feature set 314 is not optimized in the sense that the relative importance of each feature to the task of disfluency identification is unknown. Optimization of the feature set, or calculation of feature weights, is accomplished through the boosting algorithm described above. Briefly, the candidate feature set is used with a disfluency identifier to find edited words in a set of training data. Since training data contains edit tag annotation it is possible to measure 318 the performance of the disfluency identification using feature set 314. Feature weights are then adjusted 320 to try to improve disfluency identification performance. In addition the training data is adjusted so that parts of the data which cause the worst performance are repeated most often. This leads to better training results. The final result of the iterative boosting algorithm is a model comprising a weighted feature set 116.

In C&J, identifying edited regions is considered as a classification problem, where each word is classified either as edited or normal. The approach first finds a rough copy. Then, a number of variables are extracted for the boosting algorithm. In particular, a total of 18 different conditioning variables are used to predict whether the current word is an edited word or a non-edited word. The first 18 variables ($X_1$-$X_{18}$) shown in FIG. 5 correspond to the 18 different dimensions/factors for the current word position as used by Charniak and Johnson. Among the 18 variables, six of them, $N_m$, $N_n$, $N_i$, $N_j$, $N_r$ and $T_f$, depend on the identification of a rough copy.

For convenience, the conventional definition of rough copy is repeated here. A rough copy in a string of tagged words has the form of $\partial_1 \beta \lambda \partial_2$, where:
1. $\partial_1$ (the source) and $\partial_2$ (the copy) both begin with non-punctuation,
2. the strings of non-punctuation POS tags of $\partial_1$ and $\partial_2$ are identical,
3. $\beta$ (the free final) consists of zero or more sequences of a free final word (see below) followed by optional punctuation,
4. $\lambda$ (the interregnum) consists of sequences of an interregnum string (see below) followed by optional punctuation.

The set of free final words includes all partial words and a small set of conjunctions, adverbs and miscellanea. The set of interregnum strings consists of a small set of expressions such as uh, you know, I guess, I mean, etc.

The definition for rough copy is modified, because more than 94% of all edits have both reparandum and repair, while the rough copy defined in C&J only covers 77.66% of such instances.

Two methods are used to modify the rough copy definition. The first one is to adopt a hierarchical POS tag set: all the Switchboard POS tags are further classified into four major categories: N (noun related), V (verb related), Adj (noun modifiers), Adv (verb modifiers). Instead of requiring the exact match of two POS tag sequences, an embodiment considers two sequences as rough copy if their corresponding major categories match. This modification increases the rough copy coverage, (the percent of words in edited regions found through the definition of rough copy), from 77.66% to 79.68%.

The second is to allow one mismatch in the two POS sequences. The single mismatches can be additions, deletions, or substitutions. This improves the coverage from 77.66% to 85.45%. Subsequently, the combination of modifications to the rough copy definition leads to a significantly higher coverage of 87.70%. Additional relaxation of the definition of rough copy leads to excessive candidates and worse performance in the development set.

An embodiment also includes new conditioning variables: one is the shortest distance (the number of words) between the current word and a word of the same orthographic form to the right, if that repeated word exists; another is the number of words considered around the current position. Based on distributional analysis, the window sizes for POS tags ($T_{-5}, \ldots, T_5$) and words ($W_{-5}, \ldots, W_5$) are increased to ±5 and partial words ($P_{-3}, \ldots, P_3$) are increased to ±3, extending $T_i$ and $P_j$.

FIG. 5 lists the number, name and description of an assortment of conditioning variables. In FIG. 5, $X_1$-$X_{18}$ are the conditioning variables used by Charniak and Johnson. New variables $X_{19}$-$X_{38}$ are used to generate a feature set which leads to an improved model for disfluency identification.

In addition, an embodiment uses contextual patterns to address the independency of variables in the features. The patterns have been extracted from development and training data, to deal with certain sequence-related errors, e.g.,

ENE→EEE, which means that if the neighbors on both sides of a word are classified as EDITED, the word should be classified as EDITED as well.

A number of experiments were conducted to test the effectiveness of the feature space exploration described herein. Since the original code from C&J is not available, a first experiment was conducted to replicate the result of their baseline system. The same training and testing data is used from the Switchboard corpus as in C&J. The training subset consists of all files in sections 2 and 3 of the Switchboard corpus. Section 4 is split into three approximately equal size subsets. The first of the three, i.e., files sw4004.mrg to sw4153.mrg, is the testing corpus. Files sw4519.mrg to sw4936.mrg are the development corpus. The rest of the files are reserved for other purposes. When punctuation is included in both training and testing, the re-established baseline has precision, recall, and F-score of 94.73%, 68.71% and 79.65%, respectively. These results are comparable with the results from C&J, i.e., 95.2%, 67.8%, and 79.2%.

In subsequent experiments additional features are added as noted in Tables 1 and 2. The first addition includes the shortest distance to the same word and window size increases. This gives a 2.27% improvement on F-score over the baseline. The next addition is the introduction of the POS hierarchy in finding rough copy. This also gives more than 3% absolute improvement over the baseline and 1.19% over the expanded feature set model. The use of relaxed matches for words, POS tags, and POS hierarchy tags all give additive improvements, which leads to an overall of 8.95% absolute improvement over the re-implemented baseline, or 43.98% relative error reduction on F-score.

When compared with recent results from Johnson and Charniak, where no punctuation is used for either training or testing data, the same trend of improved results is observed. A best result gives 4.15% absolute improvement or 20.44% relative error reduction in f-scores. As a sanity check, when evaluated on the training data as a cheating experiment, consistency is found with the results for testing data.

TABLE 1

Summary of results for various feature spaces.

| | Results on training data with punctuation | | | Results on testing data | | | | | |
|---|---|---|---|---|---|---|---|---|---|
| | | | | Punctuation on both | | | No punctuation on both | | |
| Method codes | Precision | Recall | f-score | Precision | Recall | f-score | Precision | Recall | f-score |
| CJ'01 | | | | 95.2 | 67.8 | 79.2 | | | |
| JC'04 p | | | | | | | 82.0 | 77.8 | 79.7 |
| R CJ'01 | 94.9 | 71.9 | 81.81 | 94.73 | 68.71 | 79.65 | 91.46 | 64.42 | 75.59 |
| +d | 94.56 | 78.37 | 85.71 | 94.47 | 72.31 | 81.92 | 91.79 | 68.13 | 78.21 |
| +d + h | 94.23 | 81.32 | 87.30 | 94.58 | 74.12 | 83.11 | 91.56 | 71.33 | 80.19 |
| +d + rh | 94.12 | 82.61 | 87.99 | 92.61 | 77.15 | 84.18 | 89.92 | 72.68 | 80.39 |
| +d + rw | 96.13 | 82.45 | 88.77 | 94.79 | 75.43 | 84.01 | 92.17 | 70.79 | 80.08 |
| +d + rw + rh | 94.42 | 84.67 | 89.28 | 94.57 | 77.93 | 85.45 | 92.61 | 73.46 | 81.93 |
| +d + rw + rt + wt | 94.43 | 84.79 | 89.35 | 94.65 | 76.61 | 84.68 | 92.08 | 72.61 | 81.19 |
| +d + rw + rh + wt | 94.58 | 85.21 | 89.65 | 94.72 | 79.22 | 86.28 | 92.69 | 75.30 | 83.09 |
| +d + rw + rh + wt + ps | 93.69 | 88.62 | 91.08 | 93.81 | 83.94 | 88.60 | 89.70 | 78.71 | 83.85 |

TABLE 2

Description of method codes used in Table 1.

| Method codes | Method description |
|---|---|
| CJ'01 | Charniak and Johnson 2001 |
| JC'04 p | Johnson and Charniak 2004, parser results |
| R CJ'01 | Duplicated results for Charniak and Johnson 2001 |
| +d | Distance + window sizes |
| +d + h | Distance + window sizes + POS hierarchy in rough copy |
| +d + rh | Distance + window sizes + relaxed POS hierarchy in rough copy |
| +d + rw | Distance + window sizes + relaxed word in rough copy |
| +d + rw + rh | Distance + window sizes + relaxed word and POS hierarchy in rough copy |
| +d + rw + rt + wt | Distance + window sizes + word & tag pairs + relaxed word and POS in rough copy |
| +d + rw + rh + wt | Distance + window sizes + word & tag pairs + relaxed word and POS hierarchy in rough copy |
| +d + rw + rh + wt + ps | Distance + window sizes + word & tag pairs + relaxed word and POS hierarchy in rough copy + pattern substitution |

For error analysis, 100 sentences with 1673 words total were randomly selected from the test sentences that have at least one mistake. Errors can be divided into two types, miss (should be edited) and false alarm (should be normal). Among the 207 misses, about 70% of them require some phrase level analysis or acoustic cues for phrases. For example, one miss is "because of the friends because of many other things", an error with a much better chance of identification, if able to identify prepositional phrases reliably. Another example is "most of all my family". Since it is grammatical by itself, certain prosodic information in between "most of" and "all my family" may help the identification.

The second major class of the misses is certain short words that are not labeled consistently in the corpus. For example, "so", "and", and "or", when they occur in the beginning of a sentence, are sometimes labeled as edited, and sometimes just as normal. The last category of the misses, about 5.3%, contains the ones where the distances between reparanda and repairs are often more than 10 words.

Among the 95 false alarms, more than three quarters of misclassified ones are related to certain grammatical constructions. Examples include cases like, "the more . . . the more" and "I think I should . . .". These cases may be fixable if more elaborated grammar-based features are used.

In addition to a distributional analysis for the edited regions, a number of feature spaces have been explored and tested to show their effectiveness. A 43.98% relative error reduction is observed on F-scores for the baseline with punctuation in both training and testing C&J. Compared with the reported best result, the same approach produced a 20.44% relative error reduction on F-scores when punctuation is ignored in training and testing data. The inclusion of both hierarchical POS tags and the new rough copy definition gives large additive improvements, and the combination of the two has contributed to nearly half of the gain for the test set with punctuation and about 60% of the gain for the data without punctuation.

Future research will include the use of other features, such as prosody, and the integration of the edited region identification with parsing.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

While the processing systems and methods described herein have been described in connection with what are presently considered to be the most practical and preferred embodiments, it is to be understood that the processing systems and methods are not limited to the disclosed embodiments and alternatives as set forth above, but on the contrary is intended to cover various modifications and equivalent arrangements included within the scope of the following claims.

Aspects of the processing systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the processing systems and methods include: microcontrollers with memory (such as electronically erasable programmable read only memory (EEPROM)), embedded microprocessors, firmware, software, etc. Furthermore, aspects of the processing systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various components disclosed herein may be described and expressed (or represented) as data and/or instructions embodied in various computer-readable media. Computer-readable media in which such data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the processing systems and methods is not intended to be exhaustive or to limit the processing systems and methods to the precise form disclosed. While specific embodiments of, and examples for, the processing systems and methods are described herein for illustrative purposes, various equivalent modifications are possible within the scope of the processing systems and methods, as those skilled in the relevant art will recognize. The teachings of the processing systems and methods provided herein can be applied to other processing systems and methods, not only for the systems and methods described above.

The elements and acts of the various embodiments described above can be combined to provide further embodiments. These and other changes can be made to the processing systems and methods in light of the above detailed description.

Each publication, patent, and/or patent application mentioned in this specification is herein incorporated by reference in its entirety to the same extent as if each individual publication and/or patent application was specifically and individually indicated to be incorporated by reference.

In general, in the following claims, the terms used should not be construed to limit the processing systems and methods to the specific embodiments disclosed in the specification and the claims, but should be construed to include all processing systems that operate under the claims. Accordingly, the processing systems and methods are not limited by the disclosure, but instead the scope of the processing systems and methods are to be determined entirely by the claims.

While certain aspects of the processing systems and methods are presented below in certain claim forms, the inventors contemplate the various aspects of the processing systems and methods in any number of claim forms. For example, while only one aspect of the processing systems and methods is recited as embodied in machine-readable medium, other aspects may likewise be embodied in machine-readable medium. Accordingly, the inventors reserve the right to add additional claims after filing the application to pursue such additional claim forms for other aspects of the processing systems and methods.

What is claimed is:

1. A computer-implemented method for processing spoken language comprising:
   converting spoken words into a text word sequence in a processor-based natural language processing system executing program code;
   tagging words in the text word sequence with part-of-speech (POS) tags through a part-of-speech tagger component of the system; and
   tagging edited words in the text word sequence using a disfluence identifier component of the system that operates with a feature set created with techniques comprising:
      matching only the highest level POS tags in a multi-level hierarchy of such tags, wherein the highest level of the hierarchy comprises categories of tags including a noun category, a verb category, an adjective category, and an adverb category;
      processing a resulting sequence of word-POS-tag pairs to mark each word in a text sequence with an edited-word-tag;
      removing sequence-related errors in edited-word-tag information before parsing the text word sequence;
      parsing the text word sequence into machine instructions with the aid of POS-tag and edited-word-tag information; and
      allowing single mismatches in POS-tag sequences of rough copy, wherein rough copy in a string of POS-tagged words produces candidates for any potential pairs of reparanda and repairs by applying an algorithm to the string of POS-tagged words.

2. A method as in claim 1 wherein the disfluence identifier operates with a feature set created with techniques further comprising including distance to next identical orthographic word as a conditioning variable.

3. A method as in claim 2 wherein the disfluence identifier operates with a feature set created with techniques further comprising using a word window size of plus or minus five positions.

4. A method as in claim 3 wherein the disfluence identifier operates with a feature set created with techniques further comprising using a POS-tag window size of plus or minus five positions.

5. A method as in claim 4 wherein the disfluence identifier operates with a feature set created with techniques further comprising using a partial-word window size of plus or minus three positions.

6. A processor-based system for processing spoken language comprising:
   a speech recognition unit of the processor-based system configured to execute program code to convert spoken words into a text word sequence;
   a part-of-speech (POS) tagger of the processor-based system configured to execute program code to tag words in the text word sequence with part-of-speech tags;
   a disfluence identifier of the processor-based system configured to execute program code to tag edited words in the text word sequence with a feature set created with techniques comprising,
      matching only the highest level POS tags in a multi-level hierarchy of such tags;
   a parser for parsing the text word sequence into machine instructions with the aid of POS-tag and edited-word-tag information; and
   modifying a conventional definition of a rough copy by allowing single mismatching in POS-tag sequences of rough copy, wherein the conventional definition of rough copy in a string of tagged words has the form of $\partial_1 \beta \lambda \partial_2$, where,
      $\partial_1$ (the source) and $\partial_2$ (the copy) both begin with non-punctuation;
      the strings of non-punctuation POS tags of $\partial_1$ and $\partial_2$ are identical;
      $\beta$ (the free final) consists of zero or more sequences of a free final word (see below) followed by optional punctuation; and
      interregnum "$\lambda$" consists of sequences of an interregnum string followed by optional punctuation.

7. A system as in claim 6 wherein the highest level POS tags in a multi-level hierarchy of such tags comprise tags corresponding to the categories noun-related, verb-related, noun-modifiers and verb-modifiers respectively.

8. A system as in claim 6 wherein the disfluence identifier operates with a feature set created with techniques further comprising including distance to next identical orthographic word as a conditioning variable.

9. A system as in claim 8 wherein the disfluence identifier operates with a feature set created with techniques further comprising using a word window size of plus or minus five positions.

10. A system as in claim 9 wherein the disfluence identifier operates with a feature set created with techniques further comprising using a POS-tag window size of plus or minus five positions.

11. A system as in claim 10 wherein the disfluence identifier operates with a feature set created with techniques further comprising using a partial-word window size of plus or minus three positions.

12. A computer-implemented method for creating a disfluence identifier model comprising:
   analyzing the distribution of speech repairs in transcribed speech in a processor-based natural language processing system executing program code;
   designating major categories of tags in a multi-level hierarchy of tags in a part-of-speech tagger unit of the natural language processing system, wherein the major categories comprise a noun category, a verb category, an adjective category, and an adverb category;
   choosing conditioning variables commensurate with the distribution of speech repairs;

using a rough copy identifier with the conditioning variables to generate a feature set, in a disfluence identifier unit of the natural language processing system, wherein the rough copy identifier allows single mismatches in POS-tag sequences of rough copy, and wherein POS-tags are subordinate categories to the designated major categories in the multi-level hierarchy; and, weighting the feature set according to an iterative algorithm run on training data and executed in the natural language processing system, wherein the rough copy identifier allows single mismatches in POS-tag sequences of rough copy.

13. A method as in claim 12 wherein the conditioning variables chosen comprise a variable representing the distance to the next identical orthographic word.

14. A method as in claim 12 wherein the rough copy identifier matches only the highest level POS tags in the multi-level hierarchy.

* * * * *